(12) United States Patent
Flynn

(10) Patent No.: US 10,937,048 B2
(45) Date of Patent: Mar. 2, 2021

(54) DATA COLLECTION SYSTEM

(71) Applicants: Kyle Flynn, Akron, OH (US); Sam Borick, Akron, OH (US); Ipsail, LLC, Akron, OH (US)

(72) Inventor: Kyle Flynn, Akron, OH (US)

(73) Assignees: Sam Borick, Akron, OH (US); Ipsail, LLC, Akron, OH (US)

( * ) Notice: Subject to any disclaimer, the term of this patent is extended or adjusted under 35 U.S.C. 154(b) by 235 days.

(21) Appl. No.: 15/948,328

(22) Filed: Apr. 9, 2018

(65) Prior Publication Data

US 2018/0293606 A1    Oct. 11, 2018

Related U.S. Application Data

(60) Provisional application No. 62/483,091, filed on Apr. 7, 2017, provisional application No. 62/487,660, filed on Apr. 20, 2017.

(51) Int. Cl.
*G06Q 30/02* (2012.01)

(52) U.S. Cl.
CPC ..... *G06Q 30/0236* (2013.01); *G06Q 30/0203* (2013.01); *G06Q 30/0261* (2013.01); *G06Q 30/0267* (2013.01)

(58) Field of Classification Search
CPC .................................................. G06Q 30/02
See application file for complete search history.

(56) References Cited

U.S. PATENT DOCUMENTS

| | | | | |
|---|---|---|---|---|
| 2004/0006478 A1* | 1/2004 | Alpdemir | ............... | G06Q 30/02 704/275 |
| 2012/0245990 A1* | 9/2012 | Agarwal | ............ | G06Q 30/0202 705/14.25 |
| 2012/0259686 A1* | 10/2012 | Yurow | ............... | G06Q 30/0241 705/14.17 |
| 2014/0019223 A1* | 1/2014 | Mavrikis | ................ | G06Q 30/02 705/14.27 |
| 2014/0358632 A1* | 12/2014 | Graff | .................. | G06Q 30/0224 705/7.29 |
| 2015/0363816 A1* | 12/2015 | Poglitsch | ............ | G06Q 30/0235 705/14.35 |
| 2016/0029368 A1* | 1/2016 | Borenstein | ............ | H04W 4/029 709/205 |
| 2016/0343023 A1* | 11/2016 | Sorem | ................ | G06Q 30/0231 |
| 2016/0345076 A1* | 11/2016 | Makhlouf | ........ | H04N 21/44222 |

* cited by examiner

*Primary Examiner* — Kurtis Gills
(74) *Attorney, Agent, or Firm* — Emerson, Thomson & Bennett, LLC; Roger D. Emerson; Peter R. Detorre

(57) ABSTRACT

Provided are various methods of data collection and providing feedback to business owners and other types of venues using a software application. The software application includes various levels including a venue software application level, a consumer software application level and a cloud-based server software application level. The consumer software application is downloaded onto a smart device and notifications are sent to the smart device when a consumer enters a venue's defined geo-fences. The notification informs the consumer of survey-voucher pairs, where vouchers may be redeemed in exchange for the consumer completing surveys. The information obtained from the surveys provides feedback to venues and business owners.

20 Claims, 6 Drawing Sheets

DATA COLLECTION SYSTEM

TECHNICAL FIELD

The present disclosure relates to data collection systems. More particularly, the present disclosure is directed to software that combines notifications, vouchers, Geo-fences, surveys, data collection, and gamification in direct marketing efforts.

BACKGROUND

There are many managers and corporate entities who struggle to attract customers, particularly during slow trafficked periods of the day.

It is of vital importance that these managers and corporate entities are able to collect and analyze accurate customer data, so that they can tailor their offerings to Consumer tastes and preferences.

If a manager or corporate entity fails to listen carefully to changes in Consumer taste, the company may jeopardize its sales and eventually be driven out of business.

Therefore, efforts to collect data have become increasingly important within the marketplace. Current forms of obtaining data include purchasing Consumer panel data from collection companies, obtaining free data from public entities, and collecting data independently.

Arguably, the most valuable data in the marketplace is location specific data because it presents the most opportunity for companies to customize solutions to localized markets. One method of collecting this data is through soliciting customer feedback on the back of receipts (hereinafter receipt surveys). However, the amount of usable data obtained through receipt surveys is very limited.

There exist many owners and/or operators of businesses or organizations, and many third parties who desire to collect data about the potential customers that pass in proximity to their physical establishment. These entities are referred hereinafter as "Business Owners".

There also exist many people who may or may not own businesses but are interested in exchanging their responses to surveys for vouchers for products and services. These people are referred hereinafter as "Consumers."

The disclosure provided herein provides a means to obtain credible consumer feedback in real time and to promote sales of existing and new products. It also provides a means to increase the visibility of the business itself as well as the business's product line.

SUMMARY

Disclosed herein are data collection systems and methods that combine notifications, vouchers, geo-fences, surveys, data collection, and gamification in direct marketing efforts. The systems provide for the collection of consumer data whereby surveys are distributed to consumers and analyzed via a process including a mobile application triggered by geo-fencing technology, and whereby the consumer receives a voucher in exchange for the information given during the survey.

Providing the survey-voucher pair enables the business owner to obtain valuable feedback regarding products, atmosphere and enables the business owner to identify areas of success and areas that need improvement. At the same time, the availability of the survey-voucher pair promotes and advertises the business to consumers while providing the consumer with incentives to visit the business. Thus, a relationship between the consumer and business can be established and allowed to flourish according to business adjustments made in response to survey data.

According to one method of the present disclosure, a voucher is created by a software application which is redeemable by a consumer in exchange for a product, service, or coupon. A survey of questions to be answered by the consumer is then created by the software application. The relationship between the voucher and survey may be defined by either the software application or the business owner. According to certain aspects of the present disclosure, the survey must be completed before a consumer may redeem the voucher.

The software application may include several features which allow for implementation of the process disclosed herein. In certain aspects of the present disclosure, the software application allows the business owner to define a geofence about a geographical location. This geographical location may sometimes be referred to as the parent location. In certain aspects of the present disclosure, the geo-fence is tied to a physical business location.

In further aspects of the present disclosure, the software application may be installed onto a mobile device. Use of the software may begin when a consumer with a mobile device loaded with associated software enters a location defined by a geofence. Upon entering within the area defined by the geofence, a notification is generated by the software on the mobile device. This notification may, in certain cases, provide information to the consumer about the voucher and survey. The survey may then be prompted and completed by the consumer. Upon completion of the survey, the voucher is presented to the consumer where the consumer may then redeem the voucher at their convenience.

In another aspect of the present disclosure, a method is provided which includes the steps of creating a voucher, creating a survey of questions to be answered by the consumer, defining the relationship between the voucher and survey and presenting the voucher to the consumer before the survey is presented to a consumer. According to certain aspects of this method, the business owner may define a reputation threshold value. This reputation threshold value allows the business owner who may only desire consumers with a high probably of completing surveys to be able to redeem an associated voucher.

According to this method, a consumer with a mobile device loaded with associated software enters the defined geofence. A reputation value of a consumer using the software on the mobile device is calculated. Here, the reputation value is related to the probability that the consumer will complete a survey after redeeming the voucher. In certain aspects of this method, a notification is generated on the mobile device upon entering said geofence if the consumer's reputation value is above the pre-determined threshold reputation value. The notification provides information to the consumer about the voucher and the survey. Upon redemption of the voucher, the survey is sent to the consumer's mobile device for completion. The consumer's reputation value is then recalculated based upon whether or not the consumer completed the survey.

DETAILED DESCRIPTION

Figure 1:
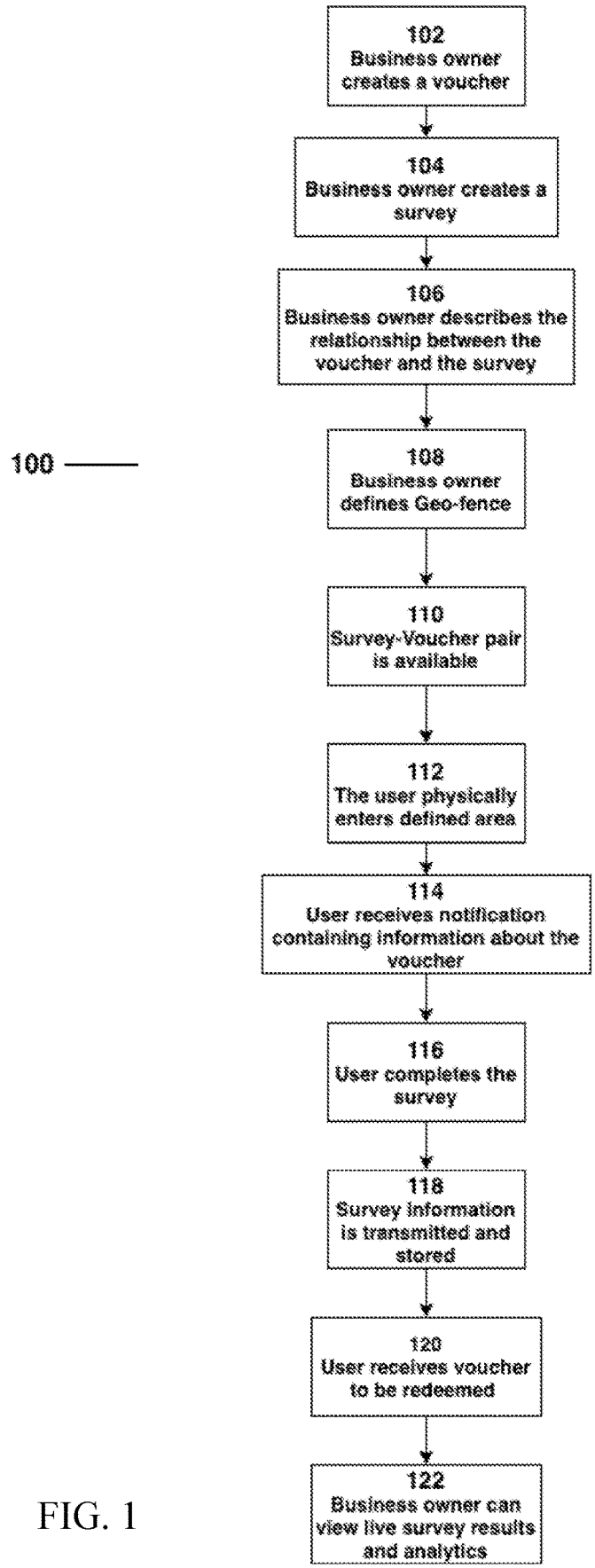
FIG. 1 illustrates a process of creating a Survey-Voucher set from the perspective of a business owner in accordance with the disclosure.

The structures shown schematically in the drawings have parts that are examples of the elements recited in the claims. The illustrated structures thus include examples of how a person of ordinary skill in the art might make and use the claimed subject matter. These structures are provided herein to meet the enablement and best mode requirements of the patent statute and are not intended to impose any limitations that are not already recited within the claims.

The present application contemplates systems and methods for various types of venues such as businesses to obtain and collect valuable data relating to the business and the business's products in exchange for vouchers. The systems and methods disclosed herein may also be used for any type of venue which offers services or products to consumers.

With reference to FIG. 1, in accordance with one aspect of the disclosure, the consumer data collection method from the business owner or venue operator's perspective includes the following steps. First, a business owner or venue creates a voucher for a product or service at step 102. Next, at step 104, the business owner or venue operator creates a survey containing questions to be answered by a consumer. For example, the business owner or venue may want to gauge the reception of a new product and, as such, direct the survey to provide customer feedback relating to the new product or service. In accordance with one aspect of the disclosure, the business owner or venue operator creates the questions and answers to multiple choice to be chosen by the consumer. In accordance with another aspect of the disclosure, the business owner or venue operator is able to pick from or modify pre-existing question and answer sets or can create custom question and answer sets. Although the process described above has the voucher being created before the survey, it is understood that in certain cases, the survey may be created before voucher.

Next, at step 106, the business owner or venue operator defines a first relationship between the voucher and the survey. This first relationship encompasses the order of presenting the voucher and the survey to the customer. For example, in accordance with one aspect of the present disclosure, a consumer may redeem the voucher before completing the survey. In accordance with another aspect of the present disclosure, a consumer receives the voucher after completing the survey.

In accordance with another aspect of the present disclosure, at step 106, the software application prompts the business owner or venue operator to decide whether he/she would like a product review or a general business or establishment review. At this point the software can, based upon the information requested by the business owner or venue operator, recommend to first offer a consumer a voucher and follow with a subsequent survey, or recommend a survey followed with a voucher reward for completing the survey.

With continued reference to FIG. 1, next, at step 108 the business owner defines the geo-fence area. Although steps 102, 104 and 108 are presented above as occurring in a certain order, it is understood that the particular order of steps 102, 104, and 108 are not definite, meaning that rather than creating a voucher first at step 102, a business owner could first define a geo-fence area, step 108. Regardless of the order of occurrence of steps 102-108, the completion of steps 102-108 trigger and set up the surveys to be completed by the consumer.

The business owner or venue operator may perform these processes on any type of computing device such as a mobile device including a mobile phone or a tablet, a laptop or a desktop.

Once a consumer with a compatible device (e.g., a mobile device such as a mobile phone or a tablet) containing the above-described software enters the business owner defined geo-fence area at step 110, a notification is sent by a server to the software on the consumer's device at step 112. In accordance with one aspect of the present disclosure, the notification is a push notification. In accordance with another aspect of the disclosure, the notifications are displayed in the system bar of the device. A sound, vibration, screen flicker, or led may also provide notification to the consumer that he/she has entered a geo-fence area with a corresponding survey-voucher pair. The notification contains information about the voucher created by the business owner.

Upon reviewing the notification, the consumer is prompted with instructions regarding the redemption of the voucher. In certain aspects of the present disclosure, the consumer completes the survey at step 114. The survey information is transmitted wirelessly and stored on a remote database server at step 116. Any type of server suitable for storing, updating, processing and accessing information may be used for this purpose. According to certain aspects of the present disclosure, the server is a cloud-based server.

Upon completion of the survey, the consumer electronically receives the voucher which may redeemed at the consumer's liberty subject to any limitations provided by the business owner or venue operator. In certain cases, the voucher may include limitations including, but not limited to, times of usage, location of usage, and expiry date and time. These limitations may be set by the software and based on a second relationship assigned by either the venue operator or the software to the results of the survey. For example, the software may assess the survey results to determine whether or not the survey was completed in good faith based on the quality of the consumer's answers and assign a corresponding value to the voucher. A consumer who thoroughly completes a survey in good faith may receive a voucher which has a higher value in that it may have a longer time of use, a broader location of usage, a higher equivalent monetary value or associated product value and an expiration date set farther in the future than a consumer who does not provide believable answers and completes only a portion of the survey. In computing the survey results and the corresponding value of the voucher, the software may assess and take into account the consumer's answers to previous surveys, the consumer's education background, the time spent taking the survey and any other factor deemed relevant to assessing the credibility of the survey results.

At step 120, the business owner or venue operator may view the consumer's survey results and statistical data compiled from multiple user completed surveys in real-time on a dashboard within the software.

In accordance with one aspect of the disclosure, the business owner can create multiple differing vouchers at step 102. In certain cases, the software may allow the consumer to choose one of the multiple vouchers to be redeemed upon completion of the survey. In other cases, the software may select and automatically present the consumer with a voucher before completion of the survey. The software may choose one of multiple vouchers to be provided to the consumer based upon the answers the consumer provided in the survey. In another aspect of the present disclosure, if the survey results indicate a consumer preference toward a certain product or service, the software can decide to issue a voucher related to the consumer's preference. The advantage here is that a consumer is more likely to come back and visit the business in order to redeem a voucher for a product or service that he/she has shown a preference towards. In a further aspect of the present disclosure, the software may follow parameters created by the business owner in issuing the voucher. For example, the business owner may set the types of vouchers that the software may choose from in issuing a voucher based on survey results. In another example, the software may use the survey results to determine the type of voucher to issue from a list of numerous products and the value of the voucher. The software may also randomly generate the voucher of a certain value. According to certain aspects of the present teaching, the voucher may be assigned a value having a certain number of super-perks equivalent to a monetary value, thereby allowing the consumer to purchase a product having an equivalent monetary value. The business owner or venue operator may also provide a set of general parameters (e.g., no discount greater than 20%) for the software to follow regarding an entire product list and discount to be applied by the voucher. The software then uses the survey results to decide on the product to be applied to the voucher and the extent of the discount applied to the voucher. The software is therefore capable of using the survey results to determine the value of the voucher. In other cases, the software selects one of the multiple vouchers to be provided to the consumer based upon the consumer's calculated reputation value.

In accordance with another aspect of the present disclosure, the business owner, at step 102, may decide to limit the number and type of vouchers available. This has the effect of increasing the rarity of the voucher which may make it more enticing to a consumer to redeem the voucher. In the situation where a business owner has a limited quantity of products available, the number of vouchers may be limited to the quantity of product available for distribution. As each voucher is supplied to a consumer, the number of available vouchers is decreased by the software. In some embodiments, when a consumer enters a geo-fence, the notification includes the number of vouchers remaining to be claimed.

In accordance with another aspect of the disclosure, in the situation where there are multiple differing vouchers available, the voucher presented to the consumer is dependent on the completion a certain percentage of the survey.

Figure 2:
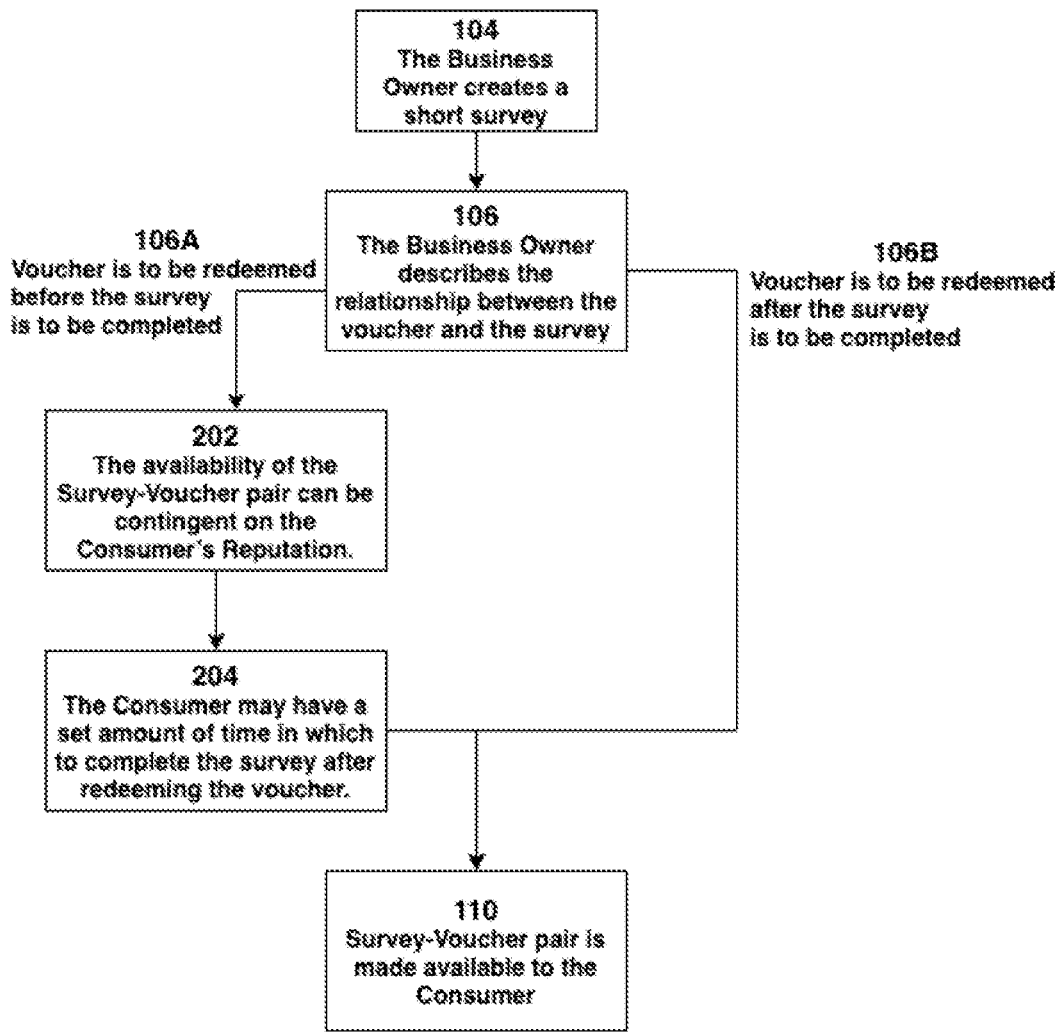
FIG. 2 is an expounded diagram of a sub-process.

With reference to FIG. 2, after the business owner creates the survey at step 104, the business owner is prompted to define the relationship between the voucher and the survey. At this point, the business owner has the option of selecting 106A where the voucher is redeemed before the survey is to be completed, or alternatively, 106B where the voucher may be redeemed after the survey is completed. When the business owner has a new product or variation he/she may wish to promote, the business owner may choose option 106A. This allows the business owner to first supply the consumer with the product and gains feedback regarding certain aspects of the product. For example, a restaurant owner with a new recipe may want to first provide a voucher for a sample of a new food item or recipe. After eating the new food item obtained through the voucher, the consumer would then provide valuable feedback about the new food item or recipe to the business owner. Based upon the feedback provided by the consumer, the business owner could then decide whether or not to continue making or to modify the new product.

In cases where the business owner selects option 106A, the availability of the Survey-Voucher pair is contingent on the consumer's reputation, step 202. In this aspect of the present disclosure, a consumer's reputation is a value calculated by the software for each unique consumer that represents the consumer's overall probability of completing the survey within a given time. This calculation may be based on the consumer's past behavior and any other metrics known to those of skill in the art for providing a predictive indicator of the consumer's behavior. Other factors that contribute to the value of a consumer's reputation include but are not limited to feedback scores from business owner's on whether the survey information from a particular consumer was useful, the number of surveys completed by the consumer, the geographical area covered by the consumer and monitored by the software and the number of social media posts, social media friends, and social media accounts.

With continued reference to FIG. 2, after selecting option 106A, the business owner or software, at step 204, may set a pre-determined amount of time for a consumer to complete the survey before or after redeeming the voucher. For example, software may require the consumer to complete the survey within an hour or require the consumer to complete the survey within a certain amount of time (for example, 10 minutes). This allows the business owner to obtain feedback from the consumer while the product is fresh in the consumer's mind. It also provides motivation for the consumer to complete the survey as early as possible since the likelihood of completing a survey diminishes with the passage of time from the time of purchase. In certain aspects of the present disclosure, the software calculates the amount of time a consumer may have to complete the survey based upon the consumer's reputation value.

Figure 3:
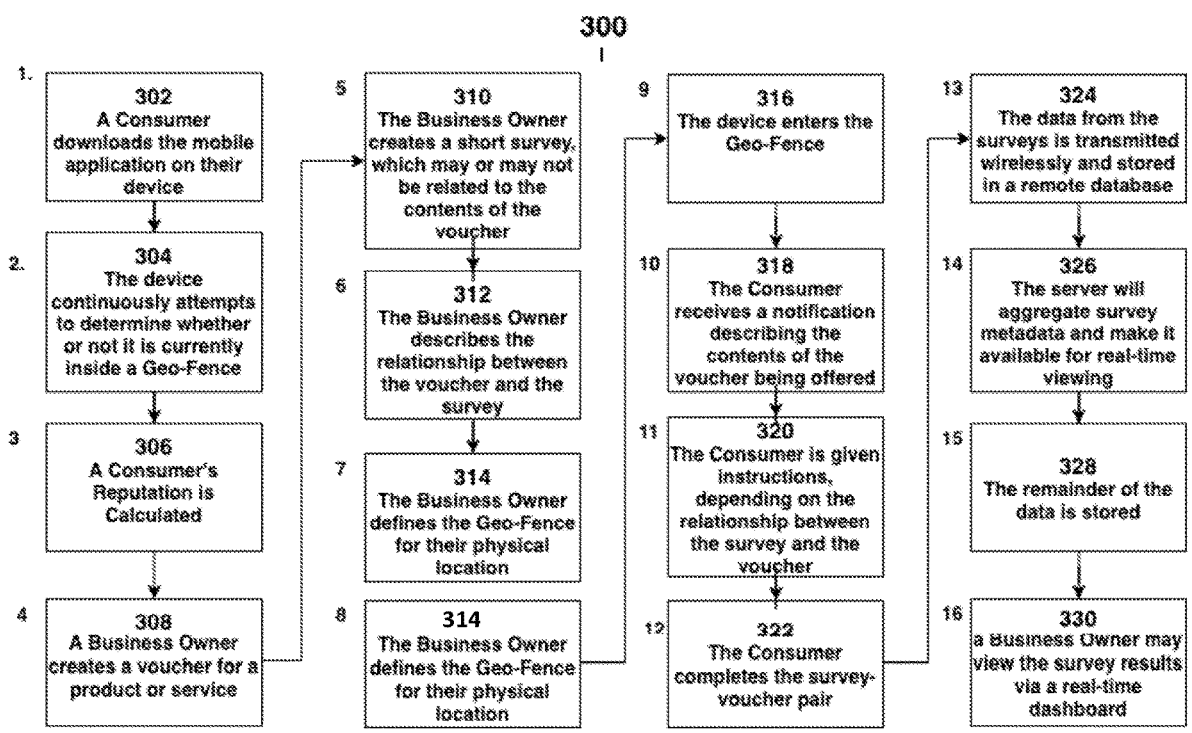
FIG. 3 illustrates a process in accordance with the present disclosure.

An overall depiction of an exemplary process is illustrated in FIG. 3. For the consumer, the process begins at step 302, where the consumer downloads the associated mobile application on their computing device. The software application may operate with any computing device. In certain aspects of the present disclosure the software application operates on a smart device such as a smart phone.

In other aspects of the present disclosure, the software may be downloaded or integrated into a media system of a vehicle which may constitute a mobile device. When integrated into the vehicle's media system, the application is triggered when the vehicle enters the geo-fence at a slow rate of speed, such as entering a fast-food drive-thru.

With continued reference to FIG. 3, the software, at step 304, continuously attempts to determine whether or not it is currently inside an area defined by a geo-fence set which contains the Survey-Voucher system.

Figure 4:
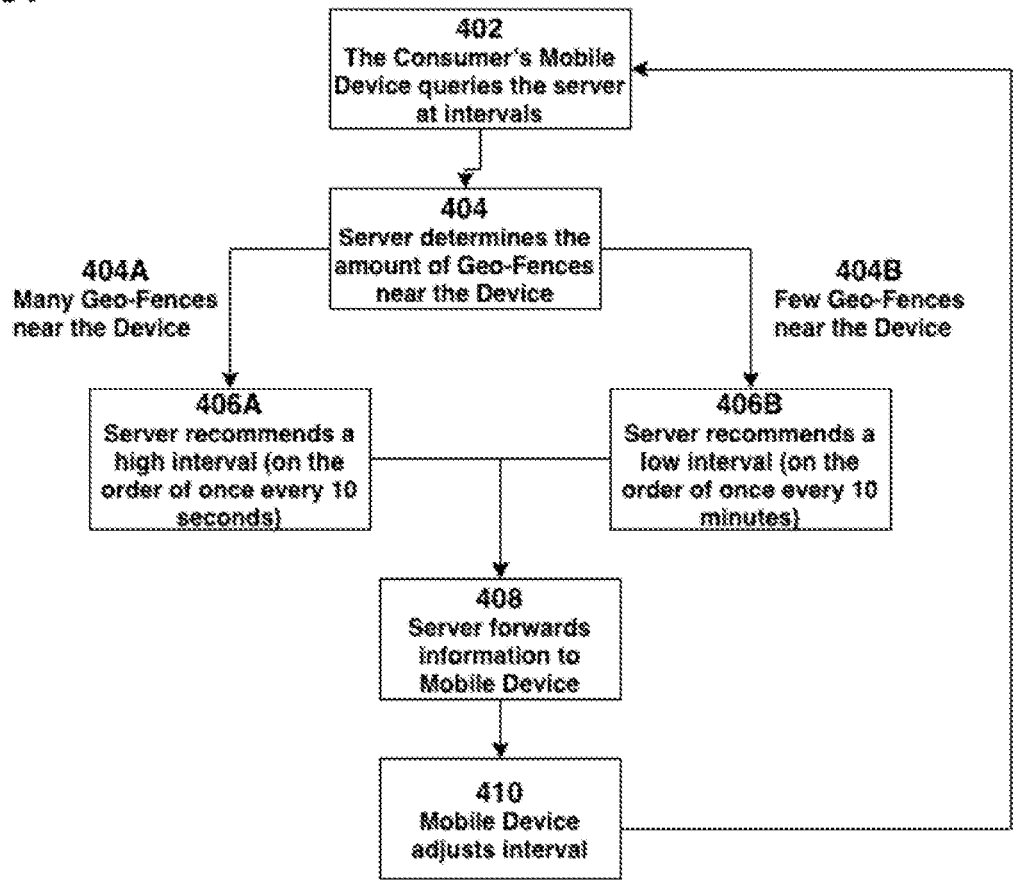
FIG. 4 illustrates a query process in accordance with the present disclosure.

Step 304 is shown in greater detail in FIG. 4. Here, at step 402, the software on the device queries the software operated on the server at intervals. The server, at step 404, determines the amount of geo-fences near the device. If the server identifies that there are many geo-fences near the device, option 404A, the server recommends a high interval, 406A, on the order of once every 10 seconds. If the server, at step 404, determines that there are a few geo-fences near the device, option 404B, the server recommends a low interval, 406B, on the order of once every 10 minutes. Next, at step 408, the server forwards the information to the device, and the software on the device adjusts the interval at step 410. The process then cycles back to step 402.

Referring back to FIG. 3, after step 304, the consumer's reputation, as defined above, is calculated at step 306.

Operation of the data collection system may be described as follows. Before a device enters a geo-fence, a business owner creates a voucher for a product or service at step 308. Next, at step 310 the business owner creates a survey containing questions to be answered by a consumer. For example, the business owner may want to gauge the reception of a new product and as such direct the survey to provide customer feedback relating to the new product or service. Next, at step 312 the business owner generates a relationship between the voucher and the survey to determine whether the voucher or the survey will be presented to the consumer first. In some cases, a consumer may redeem the voucher before completing the survey. In other cases, a consumer receives the voucher after completing the survey.

With continued reference to FIG. 3, next, at step 314, the business owner defines the geo-fence area. It is understood that the particular order of steps 308, 310, 312 and 314 are not definite, meaning that rather than creating a voucher first at step 308, a business owner could first define a geo-fence area, step 314 and then set up a voucher as in step 308. Completion of steps 308-314 set up and trigger the surveys to be completed by the consumer.

Figure 5:
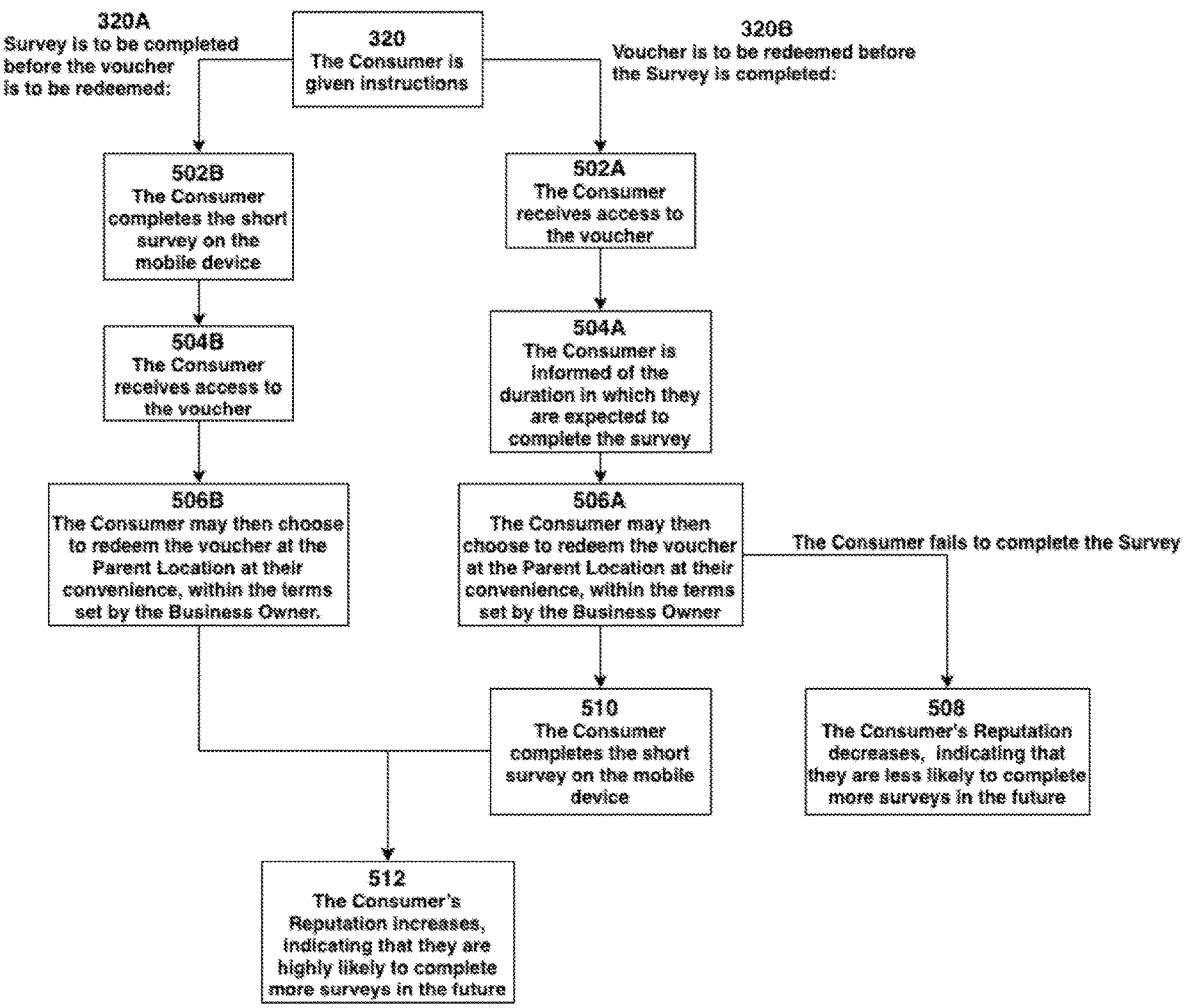
FIG. 5 illustrates a sub-process in accordance with the present disclosure.

Once a consumer with the compatible device and software enters the business owner defined geo-fence area at step 316, a notification is sent by a server to the software on the consumer's device at step 318. The notification contains information about the voucher created by the business owner. Upon reviewing the notification, at step 320, the consumer is prompted with instructions regarding the redemption of the voucher. The instructions provided to the consumer at step 320 are detailed in FIG. 5. During this step, either the voucher is redeemed before the survey is completed at 320A, or the survey is completed before the voucher may be redeemed, 320B. When the voucher is required to be redeemed before completion of the survey, 320A, the consumer receives access to the voucher at step 502A. Next, at 504A, the consumer is informed of the duration of time set for completion of the survey. The consumer may then choose to redeem the voucher at the parent location or business within the terms set by the business owner, 506A. If the consumer fails to complete the survey within the allotted time, the consumer's reputation value decreases at step 508, indicating that they are less likely to complete more surveys in the future. If the consumer completes the survey within the allotted time at step 510, the consumer's reputation value increases at step 512, indicating that they are more likely to complete surveys in the future.

When completion of the survey is required in order to gain access to the voucher (option 320B), the consumer first completes a survey at step 502B. Upon completion of the survey, the consumer is granted access to the voucher at step 504B. At this point at step 506B, the consumer may then choose to redeem the voucher at the business or parent location at their convenience and within the terms set by the business owner. Redemption of the voucher may result in the consumer's reputation increasing at step 512.

Returning to FIG. 3, after the consumer completes the survey voucher pair at step 322, the data from the survey is transmitted wirelessly and stored in a remote database at step 324. Steps 316-324 are repeated for any consumer entering into the geo-fence. The server operated software aggregates non-complex and often-used survey data, including but not limited to metadata, and makes it available for real time viewing at step 326. In accordance with another aspect of the present disclosure, the non-complex and often-used data includes the number of total respondents and the distribution of responses across multiple choice questions. In accordance with another aspect of the present disclosure, the distribution of responses are illustrated in graphical charts.

The data is compiled using a MapReduce technique. The technique involves filtering and sorting data and executing summary operations of the data. This allows for real time viewing of desirable statistical information. When an information update is requested, instead of counting all the responses at the time of the request, the value is stored continuously and updated as more data arrives.

Figure 6:
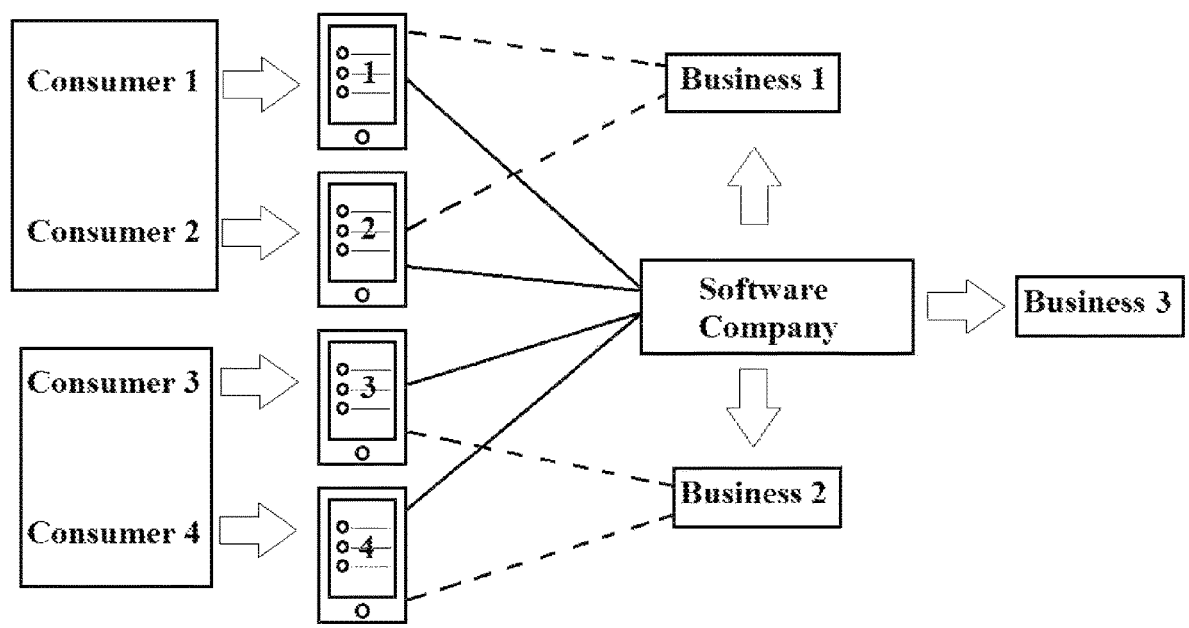
FIG. 6 illustrates a data collection method in accordance with the present disclosure.

According to certain aspects of the present disclosure, data from numerous consumer surveys across a plurality of different businesses and industries is collected by a software company. After analyzing and processing the data, the software company distributes results of the data including any conclusions and recommendations to the appropriate business associated with a particular survey. This process is illustrated within FIG. 6. According to FIG. 6, Business 1 of industry A creates a survey-voucher pair. Customers within the geo-fence of Business 1, illustrated by customer 1 and customer 2, create data by completing the survey on their corresponding smart device. Similarly, Business 2 of industry A creates a survey-voucher pair. Customers within the geo-fence of business 2, illustrated by customer 3 and customer 4, create data by completing the survey on their corresponding smart device. Business 1 receives survey data from customers 1 and 2, while business 2 receives survey data from customers 3 and 4. Meanwhile, the application software company receives data from every customer of every participating business. After collecting the data, the software company organizes and processes the data. It then sells the data including the survey results, analysis and recommendations to businesses within the relevant industries. As illustrated in FIG. 6, the Software Company compiles all of the data from Businesses 1 and 2 and sells to businesses in industry A which include business 1, 2 and 3. For example, data collected by fast food businesses could be sold to other fast food companies.

The remainder of the data is stored at step 328. This data includes the relationship between the survey, the consumer who completed the survey, and their responses to the survey. This data is retained for more complex queries and analysis on demand.

When a business owner or venue operator desires to view the survey results, the current state of the metadata is displayed in a real-time dashboard on the device. In accordance with another aspect of the present disclosure, the real-time dashboard includes a set of charts and graphs that display a visual representation of the current state of the data they represent. The dashboard queries the server for changes in metadata at regular intervals, and updates the data display as it comes in.

Should the business owner or venue operator want to run a query that is not included in the ongoing aggregate analysis, that query can be run against historical data. These queries are used to retrieve information about the relationship between properties of survey respondents and their answers to the surveys. For example, such a query includes "How many consumers exist who responded positively to 'Question 4' are above the age of 30?"

In accordance with one aspect of the present disclosure, the process further includes a step where a follow up survey is sent to a consumer that previously entered the geo-fence and completed the business owner original survey. In accordance with another aspect of the present disclosure, the follow up survey is sent after the consumer has redeemed the voucher.

The software application as described herein includes various levels of the same application which work in conjunction with the overall data collection and voucher system. Those levels include a venue software application, a consumer software application and a cloud-based server software application.

Also provided is a consumer data collection and voucher system. The consumer data collection and voucher system includes a first computing device comprising a tangible, non-transitory computer-readable medium and a processor; a second computing device comprising a tangible, non-transitory computer-readable medium and a processor; a consumer software application installed on the first computing device, wherein the software application includes a set of instructions or code which are stored on the tangible, non-transitory computer-readable medium and wherein the set of instructions or code are executed by the processor; a venue software application installed on the second computing device, wherein the venue software application includes a set of instructions or code which are stored on the tangible, non-transitory computer-readable medium, wherein the set of instructions or code are executed by the processor; a cloud-based server which receives and executes communications from the venue software application and the consumer software application on a cloud-based server application and which transmits a set of instructions and data received from the venue software application to the consumer software application and a set of instructions and data received from the consumer software application to venue software application; a geo-fence formed around a venue's establishment, wherein the geo-fence is defined by communications between the venue software application and a global positioning system (GPS) or a radio-frequency identification enabled software application and wherein the geo-fence is communicated to the consumer software application through the cloud-based server; wherein the venue software application or cloud-based server software application creates a survey and a voucher to communicate to the consumer software application, wherein the venue software application or cloud-based server software application defines a first relationship between the voucher and the survey which allows the voucher to be redeemed before completing the survey or after completing the survey; and wherein an alert is automatically triggered on the consumer software application upon a consumer entering a geo-fenced area of a venue, wherein the alert presents the consumer with an option for receiving a voucher and completing a survey, wherein the consumer receives a voucher which may be redeemed before completing the survey or a voucher which may be redeemed after completing the survey.

According to certain aspects of the consumer data collection and voucher system of claim 1, the venue software application includes controls which allow an authorized operator of the venue software application to select specific establishments for where to offer vouchers, specific times or days for when to offer vouchers and specific products to offer vouchers for.

According to further aspects of the consumer data collection and voucher system, the venue software application allows an authorized operator to select items from a pre-existing question and answer set for the survey, to select and modify items from a pre-existing question and answer set for the survey or to create a question and answer set for the survey.

According to further aspects of the consumer data collection and voucher system, the venue software application allows the operator to adjust the size of the geo-fence to be within a certain radius of the venue's establishment allowing alerts to be sent the consumer software application at an earlier or later point in time depending on the size of the geo-fence radius.

According to further aspects of the consumer data collection and voucher system, the venue software application prompts the operator to decide whether the survey is to be directed to a specific product review or a general business or establishment review.

According to further aspects of the consumer data collection and voucher system, the alert is one of a push notification, a notification displayed on a system bar, a sound, a vibration, and a screen flicker which notifies the consumer that he or she has entered a geo-fenced area of a venue which provides an option for completing a survey and receiving a voucher.

According to further aspects of the consumer data collection and voucher system, upon completion of the survey, survey data is wirelessly transmitted from the consumer software application to the cloud-based server software application and wherein the cloud-based server software application stores the survey data, processes it and transmits it to the venue software application.

According to further aspects of the consumer data collection and voucher system, the venue software application, cloud-based server software application and/or the consumer software application defines a second relationship with respect to the value of the voucher that is to be issued, wherein the value of the voucher is set by defining any one of the following parameters: a period of time or expiration date for redeeming the voucher, a number of specific venue locations for redeeming the voucher, assigning certain amount of equivalent monetary value to the voucher for redeeming products, and by associating a specific product with a voucher to be redeemed.

According to further aspects of the consumer data collection and voucher system, the venue software application, cloud-based server software application and/or the consumer software application takes into account the consumer's answers provided in the survey including how much of the survey is completed in calculating the value of the voucher that is to be issued and wherein the type and the value of the voucher provided to the consumer may be additionally dependent on a reputational value calculated and assigned to the consumer wherein the reputational value is dependent upon any one of the following: the consumer's answers provided in previous surveys, the time spent completing the survey, feedback scores from business owner's on whether survey information from the consumer was useful, the number of surveys completed by the consumer, the geographical area covered by the consumer over a period of time, the number of social media posts the consumer makes to promote the venue and a consumers social media score, wherein a consumer's social media score is based on how many social media accounts the consumer uses and how many social media friends or followers the consumer has.

According to further aspects of the consumer data collection and voucher system, the venue operator may view consumer survey results in real-time on a dashboard on the venue software application.

According to further aspects of the consumer data collection and voucher system, the cloud-based server software application and/or the consumer software application may allow the consumer to choose one of multiple vouchers to be redeemed.

According to further aspects of the consumer data collection and voucher system, the consumer software application or the venue software application chooses one of multiple vouchers to be provided to the consumer based on answers provided by the consumer in the survey.

According to further aspects of the consumer data collection and voucher system, if the survey results indicate a consumer preference toward a certain product or service, the consumer software application or the venue software application can issue a voucher related to the consumer preference.

According to further aspects of the consumer data collection and voucher system, one of the following processes occurs: i) a venue sets the types of vouchers the consumer software application, cloud-based server software application and/or the venue software application may choose from in issuing a voucher based on survey results; ii) the venue software application, cloud-based server software application and/or the consumer software application uses the survey results to automatically determine the type of voucher to issue from a list of numerous products and the value of the voucher based on parameters set by the operator of the venue software application; iii) the venue software application, cloud-based server software application and/or the consumer software application randomly generates a voucher for a specific product having a certain value from a list of products offered by the venue based on parameters set by the operator of the venue software application; iii) the venue software application, cloud-based server software application and/or the consumer software application selects a specific type of voucher of a certain value from a list of vouchers based upon a consumer's responses to the survey and/or the consumer's calculated reputational value, wherein a consumer's calculated reputational value is based on responses to past survey questions.

According to further aspects of the consumer data collection and voucher system, the venue can make a selection on the venue software application to limit the number and type of vouchers available to the consumer on the consumer software application.

According to further aspects of the consumer data collection and voucher system, the venue may set a predetermined amount of time for a consumer to complete the survey before or after redeeming the voucher and wherein if the survey is not completed within the set time period, the consumer is assessed a negative reputational score.

According to further aspects of the consumer data collection and voucher system, the first computing device is a consumer mobile device.

According to further aspects of the consumer data collection and voucher system, the consumer software application queries the cloud-based server software application at periodic intervals having a high frequency or a low frequency, wherein if the cloud-based server software application identifies first amount of geo-fences within a first distance from the consumer's mobile device, the consumer software application queries the server at a first high frequency interval and wherein if the cloud-based server software application identifies a second amount of geo-fences less than the first amount of geo-fences or that the consumer mobile device is at a second distance greater than the first distance from a geo-fence, the consumer software application queries the server at a second low frequency interval less than the first high frequency interval.

According to further aspects of the consumer data collection and voucher system, the cloud-based server software application and/or the venue software application aggregates and optionally analytically processes survey data and renders it available for viewing by the venue on the venue software application in real-time.

According to further aspects of the consumer data collection and voucher system, data is compiled using a MapReduce technique which allows for previously stored data values to be continuously updated as more data arrives.

The process and functions described herein may be implemented in hardware, software, firmware, or any combination thereof within a mobile device. If implemented in software, the functions may be stored on or transmitted over as one or more instructions or code on a computer-readable medium. The steps of the method disclosed herein may be embodied in a processor-executable software application or module, which may reside on a tangible, non-transitory computer-readable storage medium of a mobile device. Tangible, non-transitory computer-readable storage media may be any available media that may be accessed by a computer or mobile device. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer as well as combinations of the above. Additionally, the operations of the method disclosed herein may reside as one or any combination or set of codes and/or instructions on a tangible, non-transitory machine readable medium and/or computer-readable medium, which may be incorporated into a computer program product.

Numerous embodiments have been described herein. It will be apparent to those skilled in the art that the above systems, software and methods may incorporate changes and modifications without departing from the general scope of this invention. It is intended to include all such modifications and alterations in so far as they come within the scope of the systems, software and methods set forth in the appended claims or the equivalents thereof. The phrase "associated with" as used in this document, refers to structures which support the disclosed systems, software and methods and may also refer to structures not disclosed herein capable of supporting the disclosed systems, software and methods. Further, the "invention" as that term is used in this document is what is claimed in the claims of this document. The right to claim elements and/or sub-combinations that are disclosed herein as other inventions in other patent documents is hereby unconditionally reserved.

Having thus described the invention, it is now claimed:

I claim:

1. A consumer data collection and voucher system comprising:
   a first computing device comprising a tangible, non-transitory computer-readable medium and a processor;
   a second computing device comprising a tangible, non-transitory computer-readable medium and a processor;
   a consumer software application installed on the first computing device, wherein the software application includes a set of instructions or code which are stored on the tangible, non-transitory computer-readable medium and wherein the set of instructions or code are executed by the processor;

a venue software application installed on the second computing device, wherein the venue software application includes a set of instructions or code which are stored on the tangible, non-transitory computer-readable medium, wherein the set of instructions or code are executed by the processor;

a cloud-based server which receives and executes communications from the venue software application and the consumer software application on a cloud-based server software application and which transmits a set of instructions and data received from the venue software application to the consumer software application and a set of instructions and data received from the consumer software application to venue software application;

a geo-fence formed around a venue's establishment, wherein the geo-fence is defined by communications between the venue software application and a global positioning system (GPS) or a radio-frequency identification enabled software application and wherein the geo-fence is communicated to the consumer software application through the cloud-based server;

wherein the venue software application or cloud-based server software application creates a survey and a voucher to communicate to the consumer software application, wherein the venue software application or cloud-based server software application defines a first relationship between the voucher and the survey which allows the voucher to be redeemed before completing the survey or after completing the survey; and wherein an alert is automatically triggered on the consumer software application upon a consumer entering a geo-fenced area of a venue, wherein the alert presents the consumer with an option for receiving a voucher and completing a survey, wherein the consumer receives a voucher which may be redeemed before completing the survey or a voucher which may be redeemed after completing the survey;

wherein the venue software application includes controls which allow an authorized operator of the venue software application to select specific establishments for where to offer vouchers, specific times or days for when to offer vouchers and specific products to offer vouchers for;

wherein the venue software application allows an authorized operator to select items from a pre-existing question and answer set for the survey, to select and modify items from a pre-existing question and answer set for the survey or to create a question and answer set for the survey;

wherein the venue software application allows the operator to adjust the size of the geo-fence to be within a certain radius of the venue's establishment allowing alerts to be sent the consumer software application at an earlier or later point in time depending on the size of the geo-fence radius;

wherein the venue software application prompts the operator to decide whether the survey is to be directed to a specific product review or a general business or establishment review;

wherein the alert is one of a push notification, a notification displayed on a system bar, a sound, a vibration, and a screen flicker which notifies the consumer that he or she has entered a geo-fenced area of a venue which provides an option for completing a survey and receiving a voucher;

wherein upon completion of the survey, survey data is wirelessly transmitted from the consumer software application to the cloud-based server software application and wherein the cloud-based server software application stores the survey data, processes it and transmits it to the venue software application;

wherein the venue software application, cloud-based server software application and/or the consumer software application defines a second relationship with respect to the value of the voucher that is to be issued, wherein the value of the voucher is set by defining any one of the following parameters: a period of time or expiration date for redeeming the voucher, a number of specific venue locations for redeeming the voucher, assigning certain amount of equivalent monetary value to the voucher for redeeming products, and by associating a specific product with a voucher to be redeemed; and, wherein the venue software application, cloud-based server software application and/or the consumer software application takes into account the consumer's answers provided in the survey including how much of the survey is completed in calculating the value of the voucher that is to be issued and wherein the type and the value of the voucher provided to the consumer may be additionally dependent on a reputational value calculated and assigned to the consumer wherein the reputational value is dependent upon any one of the following: the consumer's answers provided in previous surveys, the time spent completing the survey, feedback scores from business owner's on whether survey;

information from the consumer was useful, the number of surveys completed by the consumer, the geographical area covered by the consumer over a period of time, the number of social media posts the consumer makes to promote the venue and a consumers social media score, wherein a consumer's social media score is based on how many social media accounts the consumer uses and how many social media friends or followers the consumer has.

2. The consumer data collection and voucher system of claim 1, wherein a venue operator may view consumer survey results in real-time on a dashboard on the venue software application.

3. The consumer data collection and voucher system of claim 2, wherein the consumer software application may allow the consumer to choose one of multiple vouchers to be redeemed.

4. The consumer data collection and voucher system of claim 3, wherein the consumer software application, cloud-based server software application and/or the venue software application chooses one of multiple vouchers to be provided to the consumer based on answers provided by the consumer in the survey.

5. The consumer data collection and voucher system of claim 4, wherein if the survey results indicate a consumer preference toward a certain product or service, the consumer software application or the venue software application can issue a voucher related to the consumer preference.

6. The consumer data collection and voucher system of claim 5, i) wherein a venue sets the types of vouchers the consumer software application, cloud-based server software application and/or the venue software application may choose from in issuing a voucher based on survey results;

ii) wherein the venue software application, cloud-based server software application and/or the consumer software application uses the survey results to automatically determine the type of voucher to issue from a list of numerous products and the value of the voucher based on parameters set by the operator of the venue software application;

iii) wherein the venue software application, cloud-based server software application and/or the consumer software application randomly generates a voucher for a specific product having a certain value from a list of products offered by the venue based on parameters set by the operator of the venue software application; or iv) wherein the venue software application, cloud-based server software application and/or the consumer software application selects a specific type of voucher of a certain value from a list of vouchers based upon a consumer's responses to the survey and/or the consumer's calculated reputational value, wherein a consumer's calculated reputational value is based on responses to past survey questions.

7. The consumer data collection and voucher system of claim 6, wherein the venue can make a selection on the venue software application to limit the number and type of vouchers available to the consumer on the consumer software application.

8. The consumer data collection and voucher system of claim 7, wherein the venue may set a pre-determined amount of time for a consumer to complete the survey before or after redeeming the voucher.

9. The consumer data collection and voucher system of claim 8, wherein the first computing device is a consumer mobile device.

10. The consumer data collection and voucher system of claim 9, wherein the consumer software application queries the cloud-based server software application at periodic intervals having a high frequency or a low frequency, wherein if the cloud-based server identifies a first amount of geo-fences within a first distance from the consumer's mobile device, the consumer software application queries the server at a first high frequency interval and wherein if the cloud-based server software application identifies a second amount of geo-fences less than the first amount of geo-fences or that the consumer mobile device is at a second distance greater than the first distance from a geo-fence, the consumer software application queries the server at a second low frequency interval less than the first high frequency interval.

11. The consumer data collection and voucher system of claim 10, wherein the cloud-based server software application or the venue software application aggregates and optionally analytically processes survey data and renders it available for viewing by the venue on the venue software application in real-time.

12. The consumer data collection and voucher system of claim 11, wherein data is compiled using a MapReduce technique which allows for previously stored data values to be continuously updated as more data arrives.

13. The consumer data collection and voucher system of claim 12, wherein the consumer software application continuously attempts to determine whether or not it is currently inside an area defined by a geo-fence which contains data collection and voucher system.

14. The consumer data collection and voucher system of claim 13, wherein the consumer software application is downloaded or integrated in a media system of a vehicle.

15. The consumer data collection and voucher system of claim 14, wherein the consumer software application is triggered when the vehicle enters the geo-fence of a venue.

16. The consumer data collection and voucher system of claim 15, wherein the consumer software application is triggered when the vehicle enters a fast-food drive-thru.

17. The consumer data collection and voucher system of claim 10, wherein the high frequency interval is on the order of once every 10 seconds and wherein the low frequency interval is on the order of once every 10 minutes.

18. The consumer data collection and voucher system of claim 8, wherein if a consumer fails to complete the survey within the allotted time, the consumer's reputational value decreases indicating that they are less likely to complete surveys in the future and wherein if the consumer completes the survey within the allotted time, the consumer's reputational value increases indicating that they are more likely to complete surveys in the future.

19. The consumer data collection and voucher system of claim 18, wherein the venue software application calculates the amount of time a consumer has to complete the survey based upon the consumer's reputational value.

20. A consumer data collection and voucher system comprising:
a first computing device comprising a tangible, non-transitory computer-readable medium and a processor;
a second computing device comprising a tangible, non-transitory computer-readable medium and a processor;
a consumer software application installed on the first computing device, wherein the software application includes a set of instructions or code which are stored on the tangible, non-transitory computer-readable medium and wherein the set of instructions or code are executed by the processor;
a venue software application installed on the second computing device, wherein the venue software application includes a set of instructions or code which are stored on the tangible, non-transitory computer-readable medium, wherein the set of instructions or code are executed by the processor;
a cloud-based server which receives and executes communications from the venue software application and the consumer software application on a cloud-based server software application and which transmits a set of instructions and data received from the venue software application to the consumer software application and a set of instructions and data received from the consumer software application to venue software application;
a geo-fence formed around a venue's establishment, wherein the geo-fence is defined by communications between the venue software application and a global positioning system (GPS) or a radio-frequency identification enabled software application and wherein the geo-fence is communicated to the consumer software application through the cloud-based server;
wherein the venue software application or cloud-based server software application creates a survey and a voucher to communicate to the consumer software application, wherein the venue software application or cloud-based server software application defines a first relationship between the voucher and the survey which allows the voucher to be redeemed before completing the survey or after completing the survey; and wherein an alert is automatically triggered on the consumer software application upon a consumer entering a geo-fenced area of a venue, wherein the alert presents the consumer with an option for receiving a voucher and completing a survey, wherein the consumer receives a voucher which may be redeemed before completing the survey or a voucher which may be redeemed after completing the survey.

* * * * *